(12) United States Patent
Vyshetsky et al.

(10) Patent No.: US 10,379,745 B2
(45) Date of Patent: Aug. 13, 2019

(54) SIMULTANEOUS KERNEL MODE AND USER MODE ACCESS TO A DEVICE USING THE NVME INTERFACE

(71) Applicant: Samsung Electronics Co., Ltd., Suwon-si, Gyeonggi-do (KR)

(72) Inventors: Konstantin Vyshetsky, San Jose, CA (US); Carlos Olle Francisco, Santa Clara, CA (US); Manoj Guthula, Los Altos, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 22 days.

(21) Appl. No.: 15/298,053

(22) Filed: Oct. 19, 2016

(65) Prior Publication Data

US 2017/0308298 A1    Oct. 26, 2017

Related U.S. Application Data

(60) Provisional application No. 62/326,459, filed on Apr. 22, 2016.

(51) Int. Cl.
*G06F 3/00* (2006.01)
*G06F 3/06* (2006.01)
*G06F 13/42* (2006.01)

(52) U.S. Cl.
CPC .......... *G06F 3/061* (2013.01); *G06F 3/0659* (2013.01); *G06F 3/0679* (2013.01); *G06F 3/0688* (2013.01); *G06F 13/4282* (2013.01); *G06F 2213/0026* (2013.01)

(58) Field of Classification Search
CPC ...... G06F 3/061; G06F 3/0659; G06F 3/0688; G06F 13/4282; G06F 2213/0026
See application file for complete search history.

(56) References Cited

U.S. PATENT DOCUMENTS

| | | | | |
|---|---|---|---|---|
| 5,317,717 A * | 5/1994 | Cutler | ................. | G06F 12/1475 711/163 |
| 5,771,383 A * | 6/1998 | Magee | .................... | G06F 9/544 718/100 |
| 6,049,866 A * | 4/2000 | Earl | .................... | G06F 12/0802 711/123 |
| 6,834,325 B1 * | 12/2004 | Milillo | ................ | G06F 12/0866 709/219 |
| 7,707,362 B2 * | 4/2010 | Bean | ..................... | G06F 12/109 711/147 |

(Continued)

*Primary Examiner* — Francisco A Grullon
(74) *Attorney, Agent, or Firm* — Innovation Counsel LLP

(57) ABSTRACT

A system and method of enabling simultaneous kernel mode access and user mode access to an NVMe device using the NVMe interface are disclosed. The method includes creating a first set of queue(s) by at least reserving a first range of memory addresses in the kernel space; providing a location address and size of the first set of queues to a controller of the NVMe device; receiving a request for user mode access from a user application process running on the host computer system; and performing the following in response to receiving the request for user mode access: creating a second set of queue(s) by at least reserving a second range of memory addresses mapped for use by the user application process, and providing a location address and size of the second set of queues to the user application process and the controller of the NVMe device.

18 Claims, 3 Drawing Sheets

(56) References Cited

U.S. PATENT DOCUMENTS

| | | | | |
|---|---|---|---|---|
| 7,845,009 B2* | 11/2010 | Grobman | ............... | G06F 21/53 |
| | | | | 718/1 |
| 7,996,722 B2* | 8/2011 | Burdick | ............... | G06F 9/3851 |
| | | | | 714/38.1 |
| 9,389,952 B2* | 7/2016 | Yu | ..................... | G11C 14/0018 |
| 2005/0033934 A1* | 2/2005 | Paladini | ................. | G06F 12/08 |
| | | | | 711/170 |
| 2005/0144422 A1* | 6/2005 | McAlpine | ........... | G06F 12/1081 |
| | | | | 711/206 |
| 2008/0244206 A1* | 10/2008 | Heo | ..................... | G06F 12/145 |
| | | | | 711/163 |
| 2010/0174946 A1* | 7/2010 | Burdick | ............... | G06F 9/3851 |
| | | | | 714/38.14 |
| 2012/0017037 A1* | 1/2012 | Riddle | .............. | G06F 17/30519 |
| | | | | 711/103 |
| 2014/0164676 A1* | 6/2014 | Borchers | ............ | G06F 12/0246 |
| | | | | 711/103 |
| 2014/0164677 A1* | 6/2014 | Borchers | ............. | G06F 3/0611 |
| | | | | 711/103 |
| 2014/0281137 A1* | 9/2014 | Circello | ............. | G06F 12/1425 |
| | | | | 711/103 |
| 2014/0281151 A1* | 9/2014 | Yu | ............................ | G06F 1/30 |
| | | | | 711/103 |
| 2014/0317336 A1* | 10/2014 | Fitch | ................... | G06F 12/0246 |
| | | | | 711/103 |
| 2015/0324137 A1* | 11/2015 | Wu | ..................... | G06F 3/0619 |
| | | | | 713/2 |
| 2015/0347314 A1* | 12/2015 | Lee | .................... | G06F 12/1009 |
| | | | | 711/103 |
| 2017/0235671 A1* | 8/2017 | Jung | ................... | G06F 12/023 |
| | | | | 711/202 |

\* cited by examiner

SIMULTANEOUS KERNEL MODE AND USER MODE ACCESS TO A DEVICE USING THE NVME INTERFACE

CROSS-REFERENCE TO RELATED APPLICATIONS

This application claims priority to and the benefit of U.S. Provisional Patent Application No. 62/326,459 titled "SYSTEM AND METHOD FOR PROVIDING OPERATING SYSTEM KERNEL MODE AND USER MODE SIMULTANEOUS HARDWARE QUEUE ACCESS" and filed on Apr. 22, 2016, the entire content of which is incorporated herein by reference.

RELATED FIELD

The present disclosure relates in general to computer hardware devices. In particular, the present disclosure relates to a system and method of providing simultaneous kernel mode and user mode access to a device using the NVMe interface.

BACKGROUND

Currently, most hard drives (HDs) and solid state drives (SSDs) are configured connect to a host computer system (or "host" for short) via the Serial Advanced Technology Attachment (SATA) bus. However, due to technological advancements, the access speed of SSDs has increased to a point where the maximum transfer speed of the SATA bus has become a bottleneck. As such, there are now also SSDs that are configured to connect to a host computer system via the Peripheral Component Interconnect Express (PCIe or PCI-E) bus, which offers higher maximum transfer speed and bandwidth scalability compared to the SATA bus.

To more fully take advantage of what the PCIe bus has to offer, the Non-Volatile Memory Express (NVMe) specification has also been developed. The NVMe specification is a logical device interface specification developed for accessing non-volatile storage media attached via the PCIe bus. The NVMe specification offers significant advantages, such as lower latency and improved multi-processor core support, over the Advanced Host Controller Interface (AHCI) specification that was developed for the SATA bus. Hereinafter, devices that adopt and operate according to the NVMe interface specification are referred to as "NVMe devices."

A way through which NVMe devices provide improved performance over SATA-enabled devices is by utilizing multiple I/O queues. These I/O queues, however, typically reside in a kernel space of the host's memory space, which means that they are accessible only by kernel mode processes. So when a user application process, which has only user mode access and runs in a designated user space of the host's memory space, has to perform an input/output (I/O) operation (e.g., read or write) on the NVMe device, the user application process would have to submit an I/O request to one or more kernel mode processes in the kernel space. That is, the user application process would have to access the I/O queues indirectly using kernel mode access. Going through the kernel processes to access the I/O queues, however, involves passing or processing the I/O request through one or more abstraction layers (e.g., the block I/O layer) and inevitably incurs latency.

SUMMARY

The present disclosure provides a method of enabling simultaneous kernel mode access and user mode access by a host computer system to an NVMe device using the NVMe interface, wherein the host computer system includes a host memory space divided into at least a kernel space and one or more user spaces. According to an example embodiment, the method comprises creating a first set of one or more queues by at least reserving a first range of memory addresses in the kernel space, providing a location address and size of the first set of queues to a controller of the NVMe device, receiving a request for user mode access from a user application process running on the host computer system, and performing the following in response to receiving the request for user mode access: creating a second set of one or more queues by at least reserving a second range of memory addresses mapped for use by the user application process, and providing a location address and size of the second set of queues to the user application process and the controller of the NVMe device.

The present disclosure also provides a non-transitory, computer-readable medium having stored thereon computer executable instructions that, when executed by a host computer system having a host memory space divided into at least a kernel space and one or more user spaces, enable simultaneous kernel mode access and user mode access to an NVMe device using the NVMe interface. According to an example embodiment, executing the instructions causes the host computer system to perform at least the following: create a first set of one or more queues by at least reserving a first range of memory addresses in the kernel space, provide a location address and size of the first set of queues to a controller of the NVMe device, receive a request for user mode access from a user application process running on the host computer system, and perform the following in response to receiving the request for user mode access: create a second set of one or more queues by at least reserving a second range of memory addresses mapped for use by the user application process, and provide a location address and size of the second set of queues to the user application process and the controller of the NVMe device.

The present disclosure also provides a host computer system that supports simultaneous kernel mode access and user mode access to an NVMe device using the NVMe interface. According to an example embodiment, the system comprises an operating system and a memory device driver. The operating system is configured to run a user application and a kernel mode process, and create a host memory space divided into at least a kernel space and one or more user spaces. The memory device driver is configured to create a first set of one or more queues by at least reserving a first range of memory addresses in the kernel space, provide a location address and size of the first set of queues to a controller of the NVMe device, receive a request for user mode access from a user application process running on the host computer system, and perform the following in response to receiving the request for user mode access: create a second set of one or more queues by at least reserving a second range of memory addresses mapped for use by the user application, and provide a location address and size of the second set of queues to the user application and the controller of the NVMe device.

BRIEF DESCRIPTION OF THE DRAWINGS

The accompanying drawings, which are included as part of the present disclosure, illustrate various embodiments and together with the general description given above and the detailed description of the various embodiments given below serve to explain and teach the principles described herein.

Figure 1:
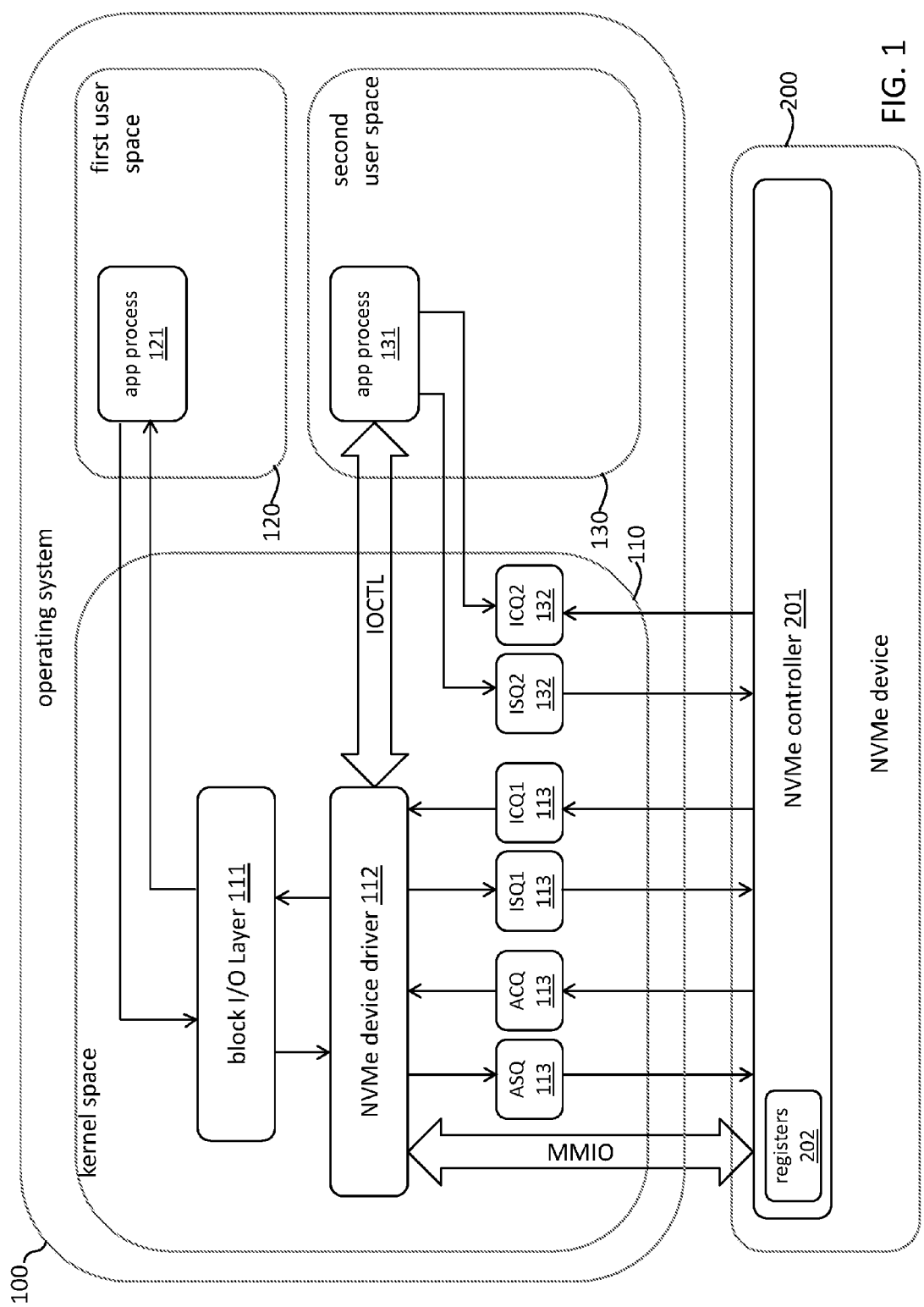
FIG. 1 is a block diagram depicting a software abstraction of a host computer system that provides simultaneous kernel mode access and user mode access to an NVMe device, according to an example embodiment of the disclosure.

The figures in the drawings are not necessarily drawn to scale and elements of similar structures or functions are generally represented by like reference numerals for illustrative purposes throughout the figures. The figures are only intended to facilitate the description of the various embodiments described herein and do not describe every aspect of the teachings disclosed herein and do not limit the scope of the claims.

DETAILED DESCRIPTION

Each of the features and teachings disclosed herein may be utilized separately or in conjunction with other features and teachings to provide the present system and method. Representative examples utilizing many of these features and teachings, both separately and in combination, are described with reference to the attached figures. While the detailed description herein illustrates to a person of ordinary skill in the art further details for practicing aspects of the present teachings, it does not limit the scope of the claims. Therefore, combinations of features disclosed in the detailed description are representative examples of the present teachings and may not be necessary to practice the teachings in the broadest sense.

The present disclosure makes references to NVMe devices, the NVMe specification, and other specific teachings as examples to illustrate the present system and method herein. However, the present system and method and applications thereof are not limited to these examples and may be applied to other devices that rely on queues to communicate with the host computer system.

As discussed earlier, each user application process runs in a designated user space of the host's memory space and typically cannot access memory locations in a kernel space of the host's memory space. Thus, when the I/O queues for communicating with an NVMe device reside in the kernel space, a user application process has to go through the kernel space and various abstraction layer(s) to perform an I/O operation on the NVMe device and thereby incurs latency. Embodiments of the present disclosure overcome the latency issue by enabling simultaneous kernel mode access and user mode access to the NVMe device. This way, user application processes that demand high performance and low latency may have user mode access to the NVMe device while kernel processes retain kernel mode access to the NVMe device.

FIG. 1 is a block diagram depicting a software abstraction of a host computer system that provides simultaneous kernel mode access and user mode access to an NVMe device, according to an example embodiment of the disclosure. The host computer system (or "host" for short) 100 runs an operating system and includes a host memory space that is divided at least into a kernel space 110 and first and second user spaces 120 and 130. The kernel space 110 includes a block I/O layer 111 and an NVMe device driver 112, each which includes one or more kernel processes. The kernel space 110 also includes a first set of queues 113, such as an administration submission queue ASQ, an administration completion queue ACQ, an I/O submission queue ISQ1, and an I/O completion queue ICQ1. The kernel space 110 also includes a second set of queues 132, such as an I/O submission queue ISQ2 and an I/O completion queue ICQ2. The sets of queues 113 and 132, however, are not limited to those shown in FIG. 1.

The ISQ1 relays I/O commands (e.g., read and write commands) to an NVMe device 200, and the ICQ1 relays the completion status of those I/O commands back to the host 100. In a similar fashion, the ASQ relays administrative commands to the NVMe device 200, and the ICQ1 relays the completion status of those administrative commands back to the host 100. Examples of an administrative command include commands for creating and deleting an I/O submission/completion queue. The NVMe device driver 112 may create the first set of queues 113 by reserving a range of memory addresses in the kernel space and providing a location address and size of the first set of queues 113 to the NVMe controller 201, for example, by writing to ASQ.

A first application process 121, which runs in a first application space 120, may perform I/O operations on the NVMe device 200 by reading and writing indirectly to the first set of queues 113 using kernel mode access. At the same time, a second application process 131, which runs in a second application space 130, may perform I/O operations on the NVMe device 200 by reading and writing directly to the second set of queues 132 using user mode access. The second user application process 131 is able to directly access the second set of queues 132 via user mode access because the NVMe device driver 112 has mapped the second set of queues 132 to the second user space 130 such that the second user application process 131 can access the queues without kernel intervention.

The first application process 121 may perform an I/O operation on the NVMe device 200 by submitting an I/O request to the block I/O layer 111, which then processes and forwards the I/O request to the NVMe device driver 112. Although not shown in FIG. 1, the I/O request may to be processed by other layers or subsystems before reaching the NVMe device driver 112.

The NVMe device driver 112 may write a corresponding I/O command to a tail position of the ISQ1 in response to receiving the I/O request. The NVMe device driver 112 may also update the value of an ISQ1 tail doorbell register corresponding to the ISQ1. The new value may be a pointer to an updated tail position of the ISQ1. The ISQ1 tail doorbell register may be one of a plurality of registers 202 in the NVMe controller 201 and may be accessed by the NVMe device driver 112 via memory-mapped I/O (MMIO) communication. Updating the value of the ISQ1 tail doorbell register, or ringing the doorbell, lets the NVMe controller 201 know that a new I/O command has been queued in the ISQ1.

The NVMe controller 201 may fetch and process I/O commands from the ISQ1, starting at a head position of the ISQ1. Although the NVMe 201 controller may fetch the I/O commands in head-to-tail order from the ISQ1, it may execute those commands in any order. After completing execution of an I/O command, the NVMe controller 201 may write a completion status to a tail position of the ICQ1 and generate, for example, an MSI-X interrupt to the host 100.

The NVMe device driver 112 may fetch completion statuses from the ICQ1, starting at a head position of the ICQ1. After fetching a completion status corresponding to the I/O request originating from the first application process 121, the NVMe device driver 112 may process completion of the requested I/O operation and pass the completion status through the block I/O layer 111 (and perhaps other layers or subsystems not shown in FIG. 1) back to the first application process 121. The NVMe device driver 112 may also update the value of an ICQ1 head doorbell register corresponding to the ICQ1. The new value may be a pointer to an updated head position of the ICQ1. The ICQ1 head doorbell register may be one of a plurality of registers 202 in the NVMe controller 201, which may be accessed by the NVMe device driver 112 via MMIO communication.

As mentioned earlier, the second application process 131 may access the second set of queues 132 via user mode access while the first application process 121 accesses the first set of queues 113 indirectly via kernel mode access. However, like the first set of queues 113, the second set of queues 132 may need to be created prior to use. For example, the second application process 131 may submit a request for user mode access to the NVMe device driver 112, which may include a request to create the second set of queues 132. The request may be sent, for example, to the NVMe device driver 132 via input/output control (IOCTL) system calls.

The NVMe device driver 112 may create the second set of queues 132 by reserving a range of memory addresses in the kernel space 110 that is mapped to the second user space 130 and providing a location address and size of the second set of queues to the second application process 112 via IOCTL system calls and to the NVMe controller 201 via commands to the ASQ. For example, the NVMe device driver 112 may write a first command to the ASQ for creating the ISQ2 and a second command for creating the ICQ2. The NVMe device driver 112 may also update the value of an ASQ tail doorbell register corresponding to the ASQ. The new value may be a pointer to a tail position of the ASQ. The ASQ submission tail doorbell register may be one of a plurality of registers 202 in the NVMe controller 201.

The NVMe controller 201 may fetch and process administrative commands from the ASQ, starting at a head position of the ASQ. Although the NVMe 201 controller may fetch the administrative commands in head-to-tail order from the ASQ, it may execute those commands in any order. After completing execution of an administrative command, the NVMe controller 201 may write a completion status to a tail position of the ACQ and generate, for example, an MSI-X interrupt to the host 100.

The NVMe device driver 112 may fetch completion statuses from the ACQ, starting at a head position of the ACQ. After fetching a completion status corresponding to the queue creation request originating from the second application process 131, the NVMe device driver 112 may pass the completion status back to the second application process 131 via IOCTL calls, which may be accompanied by a location address and size of the second set of queues 132. The NVMe device driver 112 may also update the value of an ACQ head doorbell register corresponding to the ACQ. The new value may be a pointer to an updated head position of the ACQ. The ACQ head doorbell register may be one of a plurality of registers 202 in the NVMe controller 201.

After the second set of queues 132 is created, the second application process 131 may read and write to the second set of queues 132 directly via user mode access and thereby perform I/O operations on the NVMe device 200 while bypassing kernel processes such as those in the block I/O layer 111. The second application process 121 may perform an I/O operation on the NVMe device 200 by writing a corresponding I/O command to a tail position of the ISQ2. The NVMe device driver 112 may also update the value of an ISQ2 tail doorbell register corresponding to the ISQ2. The new value may be a pointer to an updated tail position of the ISQ2. The ISQ2 tail doorbell register may be one of a plurality of registers 202 in the NVMe controller 201. Updating the value of an ISQ2 tail doorbell register lets the NVMe controller 201 know that a new I/O command has been queued in the ISQ2.

The NVMe controller 201 may fetch and process I/O commands from the ISQ2, starting at a head position of the ISQ2. Although the NVMe 201 controller may fetch the I/O commands in head-to-tail order from the ISQ2, it may execute those commands in any order. After completing execution of an I/O command, the NVMe controller 201 may write a completion status to a tail position of the ICQ2 and generate, for example, an MSI-X interrupt to the host 100.

The second application process 131 may fetch completion statuses from the ICQ2, starting at a head position of the ICQ2. After fetching a completion status corresponding to the requested I/O operation, the second application process 131 may process completion of the requested I/O operation and update the value of an ICQ2 head doorbell register corresponding to the ICQ2. The new value may be a pointer to an updated head position of the ICQ2. The ICQ2 head doorbell register may be one of a plurality of registers 202 in the NVMe controller 201.

Accordingly, the host 100 according to an example embodiment of the the present system and method provides simultaneous kernel mode access and user mode access to the NVMe device. This way, user application processes that demand high performance and low latency are provided with user mode access to the NVMe device while kernel processes retain kernel mode access to the NVMe device.

Figure 2:
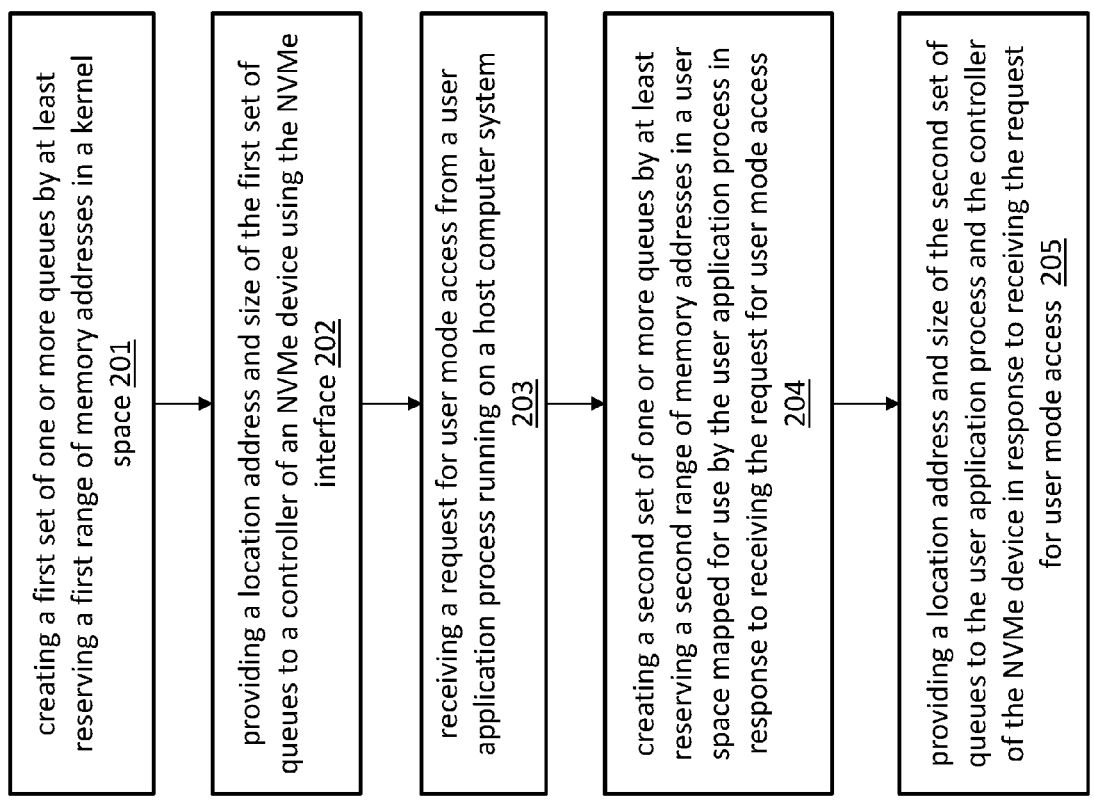
FIG. 2 shows a flowchart of high-level operations of a host computer system that provides simultaneous kernel mode access and user mode access to an NVMe device, according to an example embodiment of the present disclosure.

FIG. 2 shows a flowchart of high-level operations of a host computer system that provides simultaneous kernel mode access and user mode access to an NVMe device, according to an example embodiment of the present disclosure. User mode access may include performing I/O operations on the NVMe device while bypassing a block I/O layer in a kernel space of the host computer system. Communication between the host computer system and the NVMe device may conform to the NVMe specification.

Although one or more components of the host computer system and the NVMe device are described below as performing the disclosed operations, the present system and method are not limited thereto, and other components of the host computer system and NVMe device may perform those operations instead or in conjunction. The memory device driver creates a first set of one or more queues by at least reserving a first range of memory addresses in the kernel space (at 201). The first set of queues may include at least an administrative submission queue, an administrative completion queue, an I/O submission queue, and an I/O completion queue. The memory device driver provides a location address and size of the first set of queues to a controller of the NVMe device (at 202).

The memory device driver receives a request for user mode access from a user application process running on the host computer system (at 203). The memory device driver creates a second set of one or more queues by at least reserving a second range of memory addresses mapped for use by the user application process in response to receiving the request for user mode access (at 204). The second set of queues may include at least an I/O submission queue and an I/O completion queue. The memory device driver also provides a location address and size of the second set of queues to the user application process and the controller of the NVMe device in response to receiving the request for user mode access (at 205).

After the first and second sets of queues are created, a user application process running on the host computer system may perform a virtual memory write operation of an I/O command to the I/O submission queue in the second set of queues, and update the value of a submission tail doorbell register corresponding to the I/O submission queue in the second set of queues. Contemporaneously, a kernel mode process may perform a virtual memory write operation of an I/O command to the I/O submission queue in the first set of queues, and update the value of a submission tail doorbell register corresponding to the I/O submission queue in the first set of queues. In other words, the user application and the kernel mode process may perform, respectively and in parallel, the virtual memory write operation to the I/O submission queue in the second set of queues and the virtual memory write operation to the I/O submission queue in the first set of queues.

Figure 3:
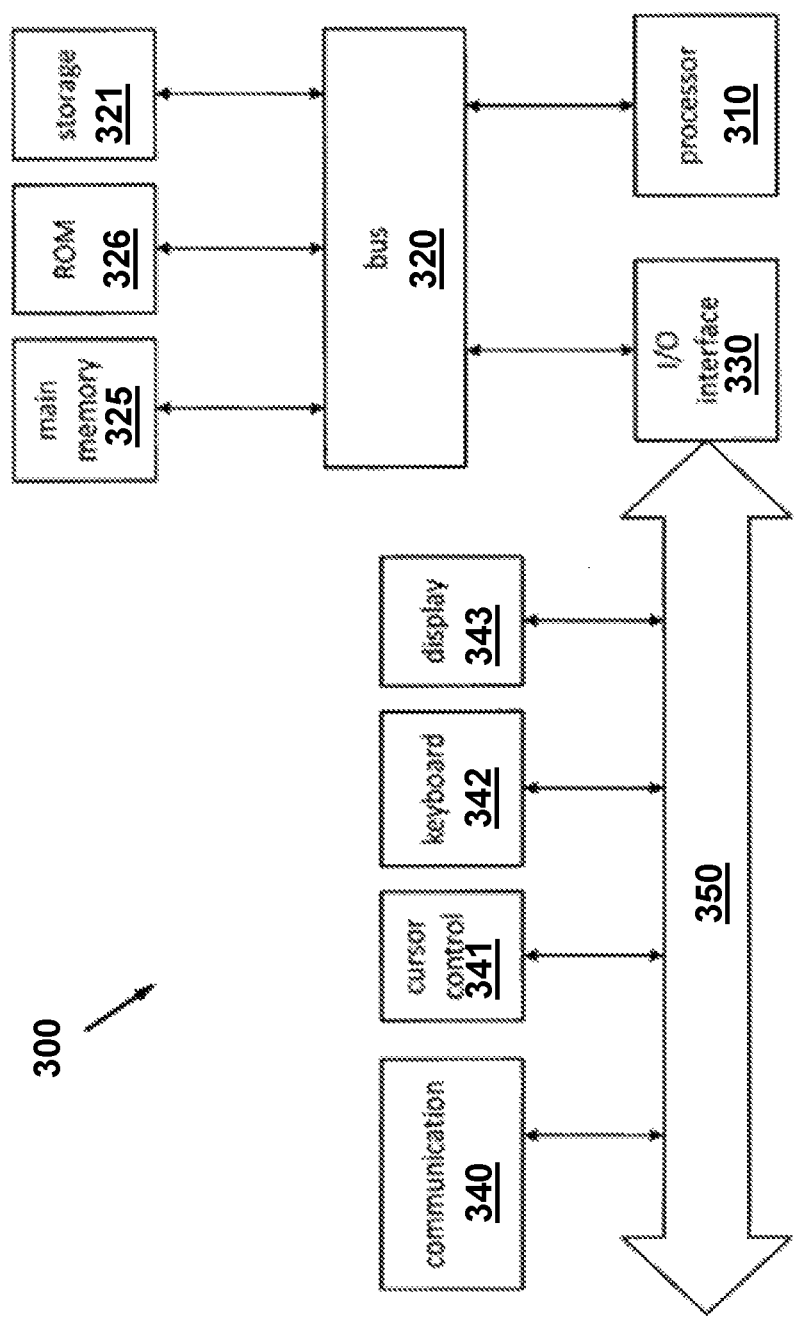
FIG. 3 illustrates an example computer architecture that may be used to implement embodiments of the present disclosure, for example, the host computer system.

FIG. 3 illustrates an example computer architecture that may be used to implement embodiments of the present system and method. The exemplary computer architecture may be used for implementing one or more components described in the present disclosure including, but not limited to, the host computer system. One embodiment of architecture 300 comprises a system bus 320 for communicating information, and a processor 310 coupled to bus 320 for processing information. Architecture 300 further comprises a random access memory (RAM) or other dynamic storage device 325 (referred to herein as main memory), coupled to bus 320 for storing information and instructions to be executed by processor 310. Main memory 325 also may be used for storing temporary variables or other intermediate information during execution of instructions by processor 310. Architecture 300 may also include a read only memory (ROM) and/or other static storage device 326 coupled to bus 320 for storing static information and instructions used by processor 310.

A data storage device 321 such as a magnetic disk or optical disc and its corresponding drive may also be coupled to architecture 300 for storing information and instructions. Architecture 300 can also be coupled to a second I/O bus 350 via an I/O interface 330. A plurality of I/O devices may be coupled to I/O bus 350, including a display device 343, an input device (e.g., an alphanumeric input device 342, a cursor control device 341, and/or a touchscreen device).

The communication device 340 allows for access to other computers (e.g., servers or clients) via a network. The communication device 340 may comprise one or more modems, network interface cards, wireless network interfaces or other interface devices, such as those used for coupling to Ethernet, token ring, or other types of networks.

Some portions of the detailed description herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, messaging servers, or personal computers may be used with programs in accordance with the teachings herein, or it may prove convenient to construct a more specialized apparatus to perform the required method steps. The required structure for a variety of these systems appears in the description above. A variety of programming languages may be used to implement the teachings of the disclosure as described herein.

Moreover, the various features of the representative examples and the dependent claims may be combined in ways that are not specifically and explicitly enumerated in order to provide additional embodiments of the present teachings. The dimensions and the shapes of the components shown in the figures are designed to help understand how the present teachings are practiced and do limit the dimensions and the shapes shown in the examples.

What is claimed is:

1. A method of enabling simultaneous kernel mode access and user mode access by a host computer system to a non-volatile memory express (NVMe) device using the NVMe interface, the host computer system includes a host memory space divided into at least a kernel space having a block I/O layer and a plurality of user spaces, the method comprises:

providing kernel mode access to an NVMe device by:
creating a first set of one or more queues by at least reserving a first range of memory addresses in the kernel space;
providing a location address and size of the first set of queues to a controller of the NVMe device; and
simultaneously providing user mode access to the controller of the NVMe device in response to receiving a request for user mode access from a user application process running on the host computer system by:
creating a second set of one or more queues by at least reserving a second range of memory addresses mapped for use by the user application process, and
providing a location address and size of the second set of queues to the user application process and the controller of the NVMe device;
such that the NVMe device is able to communicate with an application process via the first set of queues or the second set of queues, the second set of queues bypassing the block I/O layer of the kernel space.

2. The method of claim 1, wherein:
the first set of queues includes at least an administrative submission queue and an administrative completion queue, and
each set of the first and second sets of queues includes at least an input/output (I/O) submission queue and an I/O completion queue.

3. The method of claim 2, wherein user mode access from the user application process includes performing I/O operations on the NVMe device while bypassing a block I/O layer in the kernel space.

4. The method of claim 3, further comprising:
performing a virtual memory write operation of an I/O command to the I/O submission queue in the second set of queues; and
updating the value of a submission tail doorbell register corresponding to the I/O submission queue in the second set of queues.

5. The method of claim 4, further comprising:
performing a virtual memory write operation of an I/O command to the I/O submission queue in the first set of queues; and
updating the value of a submission tail doorbell register corresponding to the I/O submission queue in the first set of queues.

6. The method of claim 5, wherein the virtual memory write operation to the I/O submission queue in the second set of queues is performed in parallel with the virtual memory write operation to the I/O submission queue in the first set of queues.

7. A non-transitory, computer-readable medium having stored thereon computer executable instructions that, when executed by a host computer system having a host memory space divided into at least a kernel space with a block I/O layer and a plurality of user spaces, enable simultaneous kernel mode access and user mode access to a non-volatile memory express (NVMe) device using the NVMe interface by causing the host computer system to perform at least the following:
provide kernel mode access to an NVMe device by:
creating a first set of one or more queues by at least reserving a first range of memory addresses in the kernel space;
providing a location address and size of the first set of queues to a controller of the NVMe device; and
simultaneously provide user mode access to the controller of the NVMe device in response to receiving a request for user mode access from a user application process running on the host computer system by:
creating a second set of one or more queues by at least reserving a second range of memory addresses mapped for use by the user application process, and
providing a location address and size of the second set of queues to the user application process and the controller of the NVMe device;
such that the NVMe device is able to communicate with an application process via the first set of queues or the second set of queues, the second set of queues bypassing the block I/O layer of the kernel space.

8. The non-transitory, computer-readable medium of claim 7, wherein:
the first set of queues includes at least an administrative submission queue and an administrative completion queue, and
each set of the first and second sets of queues includes at least an input/output (I/O) submission queue and an I/O completion queue.

9. The non-transitory, computer-readable medium of claim 8, wherein user mode access from the user application process includes performing I/O operations on the NVMe device while bypassing a block I/O layer in the kernel space.

10. The non-transitory, computer-readable medium of claim 9 having stored thereon further computer executable instructions that cause the host computer system to:
perform a virtual memory write operation of an I/O command to the I/O submission queue in the second set of queues; and
update the value of a submission tail doorbell register corresponding to the I/O submission queue in the second set of queues.

11. The non-transitory, computer-readable medium of claim 10 having stored thereon further computer executable instructions that cause the host computer system to:
perform a virtual memory write operation of an I/O command to the I/O submission queue in the first set of queues; and
update the value of a submission tail doorbell register corresponding to the I/O submission queue in the first set of queues.

12. The non-transitory, computer-readable medium of claim 11, wherein the computer executable instructions further cause the host computer system to perform the virtual memory write operation to the I/O submission queue in the second set of queues in parallel with the virtual memory write operation to the I/O submission queue in the first set of queues.

13. A host computer system that supports simultaneous kernel mode access and user mode access to a non-volatile memory express (NVMe) device using the NVMe interface, the system comprising:
an operating system configured to:
run a user application and a kernel mode process,
create a host memory space divided into at least a kernel space having a block I/O layer and a plurality of user spaces; and
a memory device driver configured to:
provide kernel mode access to an NVMe device by:
creating a first set of one or more queues by at least reserving a first range of memory addresses in the kernel space,
providing a location address and size of the first set of queues to a controller of the NVMe device, and
simultaneously provide user mode access to the controller of the NVMe device in response to receiving a request for user mode access from the user application process running on the host computer system, by:
creating a second set of one or more queues by at least reserving a second range of memory addresses mapped for use by the user application, and
providing a location address and size of the second set of queues to the user application and the controller of the NVMe device:,
such that the NVMe device is able to communicate with an application process via the first set of queues or the second set of queues, the second set of queues bypassing the block I/O layer of the kernel space.

14. The host computer system of claim 13, wherein:
the first set of queues includes at least an administrative submission queue and an administrative completion queue, and
each set of the first and second sets of queues includes at least an input/output (I/O) submission queue and an I/O completion queue.

15. The host computer system of claim 14, wherein user mode access from the user application includes performing I/O operations on the NVMe device while bypassing a block I/O layer in the kernel space.

16. The host computer system of claim 15, further comprising the user application, wherein the user application is configured to:
perform a virtual memory write operation of an I/O command to the I/O submission queue in the second set of queues; and
update the value of a submission tail doorbell register corresponding to the I/O submission queue in the second set of queues.

17. The host computer system of claim 16, further comprising the kernel process, wherein the kernel mode process is configured to:
perform a virtual memory write operation of an I/O command to the I/O submission queue in the first set of queues; and
update the value of a submission tail doorbell register corresponding to the I/O submission queue in the first set of queues.

18. The host computer system of claim 17, wherein the user application and the kernel mode process are configured to perform, respectively and in parallel, the virtual memory write operation to the I/O submission queue in the second set of queues and the virtual memory write operation to the I/O submission queue in the first set of queues.

* * * * *